(12) United States Patent
Harada et al.

(10) Patent No.: US 11,618,240 B2
(45) Date of Patent: Apr. 4, 2023

(54) NONWOVEN FABRIC SHEET

(71) Applicant: Toray Industries, Inc., Tokyo (JP)

(72) Inventors: Masaru Harada, Otsu (JP); Hiroshi Tsuchikura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/978,943

(22) PCT Filed: Mar. 13, 2019

(86) PCT No.: PCT/JP2019/010193
§ 371 (c)(1),
(2) Date: Sep. 8, 2020

(87) PCT Pub. No.: WO2019/188276
PCT Pub. Date: Oct. 3, 2019

(65) Prior Publication Data
US 2021/0001596 A1    Jan. 7, 2021

(30) Foreign Application Priority Data
Mar. 30, 2018 (JP) .............................. JP2018-067720

(51) Int. Cl.
*B32B 5/26* (2006.01)
*D04H 1/4209* (2012.01)
*D04H 1/4342* (2012.01)

(52) U.S. Cl.
CPC ............ *B32B 5/26* (2013.01); *D04H 1/4209* (2013.01); *D04H 1/4342* (2013.01);
(Continued)

(58) Field of Classification Search
CPC ................ B32B 5/26; B32B 2307/304; B32B 2307/306; B32B 2307/3065; B32B 2307/308; D04H 1/4209; D04H 1/4342
(Continued)

(56) References Cited

U.S. PATENT DOCUMENTS

| 4,869,962 A | 9/1989 | McCullough, Jr. et al. |
| 5,024,877 A * | 6/1991 | McCullough, Jr. ...... E04B 1/942 442/38 |

(Continued)

FOREIGN PATENT DOCUMENTS

| CA | 2082857 A1 | 5/1993 |
| CN | 101117275 A | 2/2008 |

(Continued)

OTHER PUBLICATIONS

International Search Report and Written Opinion for International Applicaiton No. PCT/JP2019/010193, dated Jun. 11, 2019, 6 pages.
(Continued)

*Primary Examiner* — Matthew D Matzek
(74) *Attorney, Agent, or Firm* — RatnerPrestia

(57) ABSTRACT

A nonwoven fabric sheet exhibiting high flame shielding performance, heat insulating property, and wear resistance is described, where the nonwoven fabric sheet is fabricated and includes at least one fire barrier layer formed of a web containing a non-melting fiber A having a high-temperature shrinkage rate of 3% or less and a thermal conductivity conforming to ISO22007-3 (2008) of 0.060 W/m·K or less and in which the fire barrier layer is coupled with a scrim layer containing a carbide-forming heat resistant fiber B having a LOI value conforming to JIS K 7201-2 (2007) of 25 or more.

3 Claims, 1 Drawing Sheet

(52) U.S. Cl.
CPC . *B32B 2262/0269* (2013.01); *B32B 2262/105* (2013.01); *B32B 2305/22* (2013.01); *B32B 2307/302* (2013.01); *B32B 2307/306* (2013.01)

(58) Field of Classification Search
USPC .................... 442/136, 301, 414; 428/920
See application file for complete search history.

(56) References Cited

U.S. PATENT DOCUMENTS

| | | | |
|---|---|---|---|
| 7,771,810 | B2 | 8/2010 | Levit et al. |
| 2002/0182967 | A1 | 12/2002 | Erb, Jr. et al. |
| 2008/0286522 | A1 | 11/2008 | Khan et al. |
| 2009/0053956 | A1 | 2/2009 | Zhu et al. |
| 2009/0188024 | A1* | 7/2009 | Zhu .................. D02G 3/443 2/455 |
| 2009/0258180 | A1 | 10/2009 | Goulet |
| 2012/0110721 | A1 | 5/2012 | Takahashi et al. |
| 2014/0208491 | A1 | 7/2014 | Schmitt et al. |
| 2014/0248814 | A1 | 9/2014 | Handermann |
| 2016/0113340 | A1* | 4/2016 | Levit .................. B32B 5/24 2/455 |
| 2016/0223968 | A1 | 8/2016 | Nakajima et al. |
| 2017/0209823 | A1 | 7/2017 | Bansai et al. |
| 2018/0187351 | A1* | 7/2018 | Tsuchikura .......... D04H 1/4326 |

FOREIGN PATENT DOCUMENTS

| | | | |
|---|---|---|---|
| CN | 101558200 | A | 10/2009 |
| CN | 101573224 | A | 11/2009 |
| CN | 101784707 | A | 7/2010 |
| CN | 102470631 | A | 5/2012 |
| CN | 105579916 | A | 5/2016 |
| CN | 107073872 | A | 8/2017 |
| CN | 107469465 | A | 12/2017 |
| CN | 107636219 | A | 1/2018 |
| JP | 6369181 | U | 5/1988 |
| JP | 354154 | Y2 | 11/1991 |
| JP | 08142246 | A | 6/1996 |
| JP | 2012062608 | A | 3/2012 |
| JP | 2013169996 | A | 9/2013 |
| RU | 155980 | U1 | 10/2015 |
| RU | 2634242 | C2 | 10/2017 |
| WO | 2017006807 | A1 | 1/2017 |
| WO | WO-2017006807 | A1 * | 1/2017 | ............... D04H 1/42 |

OTHER PUBLICATIONS

"Conex TeijinConex Fiber Materials, Warwick Mills", retrieved from the internet at http://www.warwickmills.com/Conex.aspx, 2021, 1 page.
"Aramid 1313 Filament", retrieved from the Internet at http://www.xintiancheng.com/En/Product View.asp?ID=26, 2021, 2 pages.
Chinese Office Action for Chinese Application No. 201980021912.8, dated Dec. 9, 2021 with translation, 12 pages.
Extended European Search Report for European Application No. 19776335.2, dated Nov. 29, 2021, 7 pages.
Chinese Office Action for Chinese Application No. 201980021912.8, dated May 12, 2022, with translation, 14 pages.
Japanese Notice of Reasons for Refusal for Japanese Application No. 2019-519425, dated May 20, 2022, with translation, 8 pages.
Taiwan Office Action for Application No. 108110514, dated Jan. 27, 2022 with translation, 10 pages.
Pyron Information Sheet, www.zoltek.com, 2015, 2 pages.
Russian Office Action for Russian Application No. 2020134937, dated Jun. 15, 2022, with translation, 13 pages.
Japanese Decision of Refusal for Japanese Application No. 2019-519425, dated Sep. 22, 2022 with translation, 4 pages.
Well-known Evidence 1: "Chemical Fiber Production Technology", Chenghua Yan, 6 pages, Donghua University Press, 1st edition, published on Jan. 31, 2018, with translation.
Chinese Rejection Decision for Chinese Application No. 201980021912.8, dated Aug. 2, 2022, with translation, 13 pages.

* cited by examiner

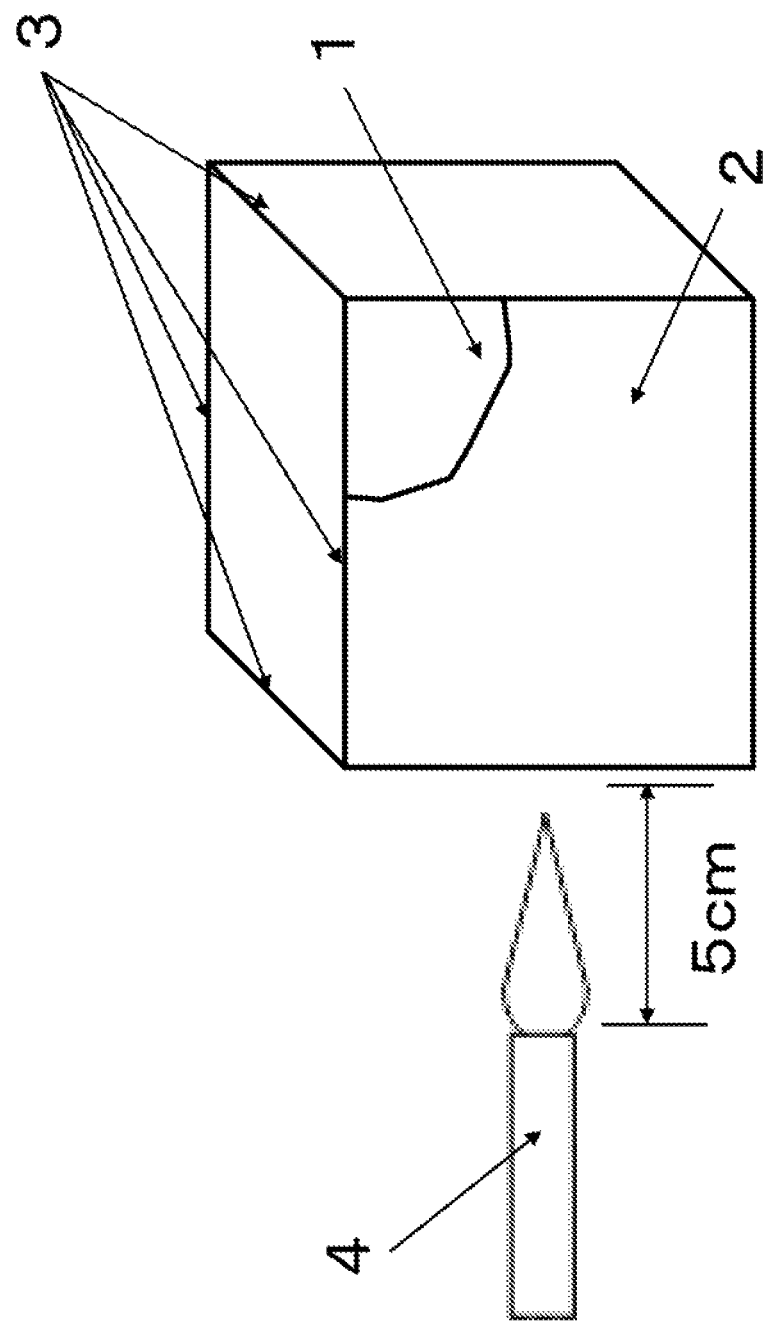

NONWOVEN FABRIC SHEET

CROSS REFERENCE TO RELATED APPLICATIONS

This is the U.S. National Phase application of PCT/JP2019/010193, filed Mar. 13, 2019, which claims priority to Japanese Patent Application No. 2018-067720, filed Mar. 30, 2018, the disclosures of these applications being incorporated herein by reference in their entireties for all purposes.

FIELD OF THE INVENTION

The present invention relates to a nonwoven fabric sheet.

BACKGROUND OF THE INVENTION

Conventionally, in applications required to exhibit flame retardancy, a method in which a chemical having a flame retardant effect is kneaded into polyester, nylon, and cellulose-based fibers at the raw yarn stage and a method in which a chemical having a flame retardant effect is applied to polyester, nylon, and cellulose-based fibers in the post-processing have been adopted.

As the flame retardant, halogen-based chemicals and phosphorus-based chemicals are generally used, but replacement of halogen-based chemicals with phosphorus-based chemicals have recently proceeded because of the environmental regulations. However, there are some phosphorus-based chemicals which do not reach the flame retardant effect of conventional halogen-based chemicals.

As a method for imparting higher flame retardancy, there is a method in which a polymer exhibiting high flame retardancy is combined. For example, paper formed of a composite of a flame resistant yarn and a polyphenylene sulfide fiber (Patent Document 1) and a felt formed of a composite of a flame resistant yarn and a polyphenylene sulfide fiber (Patent Document 2) are known.

PRIOR ART DOCUMENTS

Patent Documents

Patent Document 1: International Publication No. 2017/6807
Patent Document 2: Japanese Patent Laid-open Publication No. 2013-169996

SUMMARY OF THE INVENTION

However, conventional flame retardant performance is attained by testing how hardly the material itself is burned or whether the material can shield the flames of the burner when being heated from one surface using a burner prescribed in JIS, and it cannot be said that the conventional flame retardant performance is sufficient to prevent fire spread when the material is exposed to flames raging furiously like an actual fire for a long time or when other combustibles are present. In the method described in Patent Document 1, the flame can be shielded by the burner prescribed in JIS, but in a case in which the temperature of the heating source is higher or combustibles which ignite by temperature rise are in close contact with paper, ignition occurs when the temperature on the back side that is not hit by the flame rapidly rises and exceeds the ignition point of the combustibles which are in close contact with the opposite side that is not hit by the flame as polyphenylene sulfide carbonized by the flame transmits heat, and there is thus room for improvement.

Patent Document 2 discloses a felt formed of a composite of a flame resistant yarn and a polyphenylene sulfide fiber, but the density of the felt is low and there is a possibility that combustibles ignite when the air heated by the burner escapes from the gap of the felt, the ambient temperature on the opposite side that is not hit by the flame rapidly rises, and the combustibles are arranged on the opposite side that is not hit by the flame.

Furthermore, in the case of thin felt, there is a problem that the felt is stretched in the warp direction by the processing tension in the felt production process, the felt is partially thinned and is also inferior in wear resistance.

Accordingly, an object of the present invention is to provide a nonwoven fabric sheet exhibiting high flame shielding performance, heat insulating property, and wear resistance.

The present invention adopts the following means in order to solve the above problems.

(1) A nonwoven fabric sheet including at least one fire barrier layer formed of a web containing a non-melting fiber A having a high-temperature shrinkage rate of 3% or less and a thermal conductivity conforming to ISO22007-3 (2008) of 0.060 W/m·K or less, in which the fire barrier layer is coupled with a scrim layer containing a carbide-forming heat resistant fiber B having a LOI value conforming to JIS K 7201-2 (2007) of 25 or more.

(2) The nonwoven fabric sheet according to (1), in which the nonwoven fabric sheet contains the non-melting fiber A at 15% to 70% by mass.

(3) The nonwoven fabric sheet according to (1) or (2), in which the nonwoven fabric sheet contains the carbide-forming heat resistant fiber B at 30% to 85% by mass.

(4) The nonwoven fabric sheet according to any one of (1) to (3), in which the nonwoven fabric sheet contains a fiber C other than the non-melting fiber A and the carbide-forming heat resistant fiber B at 20% by mass or less.

(5) The nonwoven fabric sheet according to any one of (1) to (4), in which the non-melting fiber A is a flame resistant fiber or a meta-aramid-based fiber.

(6) The nonwoven fabric sheet according to any one of (1) to (5), in which the carbide-forming heat resistant fiber B is a fiber formed of a resin selected from the group consisting of anisotropic molten polyester, flame retardant poly(alkylene terephthalate), flame retardant poly(acrylonitrile butadiene styrene), flame retardant polysulfone, poly(ether-ether-ketone), poly(ether-ketone-ketone), polyether sulfone, polyarylate, polyarylene sulfide, polyphenylsulfone, polyetherimide, polyamide-imide, meta-aramid, para-aramid and any mixture of these resins.

The nonwoven fabric sheet of the present invention has the above-described configuration and thus exhibits high flame shielding performance, heat insulating property, and wear resistance.

BRIEF DESCRIPTION OF THE DRAWINGS

The FIGURE is a diagram for explaining a combustion test to evaluate flame shielding performance and heat insulating property.

DETAILED DESCRIPTION OF EMBODIMENTS OF THE INVENTION

The present invention is a nonwoven fabric sheet which includes at least one fire barrier layer formed of a web containing a non-melting fiber A having a high-temperature shrinkage rate of 3% or less and a thermal conductivity conforming to ISO22007-3 (2008) of 0.060 W/m·K or less and in which the fire barrier layer is coupled with a scrim layer containing a carbide-forming heat resistant fiber B having a LOI value conforming to JIS K 7201-2 (2007) of 25 or more.

<<High-Temperature Shrinkage Rate>>

In the present invention, the high-temperature shrinkage rate is a numerical value determined by the following equation from L0 and L1 attained as follows: a fiber, which is a raw material of the nonwoven fabric, is left to stand in a standard state (20° C., 65% of relative humidity) for 12 hours, then a tension of 0.1 cN/dtex is applied to the fiber, the original length L0 is measured, the fiber is exposed to a dry heat atmosphere at 290° C. for 30 minutes without applying a load to the fiber, sufficiently cooled in the standard state (20° C., 65% of relative humidity), and a tension of 0.1 cN/dtex is applied to the fiber, and the length L1 is measured.

$$\text{High-temperature shrinkage rate} = [(L0-L1)/L0] \times 100 \, (\%)$$

The non-melting fiber is carbonized when the flame approaches and the heat is applied thereto, but the high-temperature shrinkage rate of the non-melting fiber is 3% or less, thus the vicinity of the flame contact portion at which the temperature has increased hardly shrinks, fracture due to the thermal stress generated between the low temperature portion which is not in contact with the flame and the high temperature portion hardly occurs, and as a result, the morphology of the fire barrier layer is stable even when being exposed to the flame for a long time. It is preferable that the high-temperature shrinkage rate is low from this point, but the high-temperature shrinkage rate is preferably −5% or more since fracture of the fire barrier layer due to thermal stress is caused even when the fiber does not shrink but significantly expands by heat. Among others, the high-temperature shrinkage rate is preferably 0% to 2%.

<<Thermal Conductivity>>

Thermal conductivity is a numerical value indicating the ease of heat conduction, and a small thermal conductivity means that the temperature rise at the unheated portion is small when the material is heated from one surface. A material having a thermal conductivity of 0.060 W/m·K or less measured by a method conforming to ISO22007-3 (2008) and using a felt having a weight per unit area of 200 g/m$^2$ and a thickness of 2 mm (density: 100 kg/m$^3$) measured by a method conforming to JIS L 1913 (2010) as a test body hardly transmits heat, the temperature rise on the opposite side that is not heated can be suppressed when the material is formed into a nonwoven fabric and heated from one surface, and the possibility that the combustible ignites decreases even when a combustible is arranged on the opposite side. It is more preferable as the thermal conductivity is lower, but the upper limit thereof is about 0.020 W/m·K for available fiber materials.

<<LOI Value>>

The LOI value is the volume percentage of the minimum amount of oxygen required to sustain combustion of a substance in a mixed gas of nitrogen and oxygen, and it can be said that it is less likely to burn as the LOI value is higher. Hence, a thermoplastic fiber having a LOI value conforming to JIS K 7201-2 (2007) of 25 or more hardly burns, and even if the thermoplastic fiber catches fire, the fire is extinguished immediately when the fire source is separated from the thermoplastic fiber, and a carbonized film is usually formed at the slightly flared portion, and this carbonized portion can prevent fire spread. It is more preferable as the LOI value is higher, but the upper limit of the LOI value for actually available substances is about 65.

<<Ignition Temperature>>

The ignition temperature is a spontaneous ignition temperature measured by a method conforming to JIS K 7193 (2010).

<<Melting Point>>

The melting point is a value measured by a method conforming to JIS K 7121 (2012). The melting point refers to the value of the melting peak temperature when heating performed at 10° C./min.

<<Nonwoven Fabric Sheet Including Fire Barrier Layer Coupled with Scrim Layer>>

A fire barrier layer formed of a web containing a non-melting fiber A to be described later is coupled with a scrim layer to obtain a nonwoven fabric sheet. The scrim layer functions as a so-called reinforcing layer by being coupled with the fire barrier layer. The scrim layer preferably includes a woven fabric or a knitted fabric. By this, a regular and uniform organization of a woven fabric, a knitted fabric or the like is formed with respect to the fire barrier layer in which the fibers are randomly oriented, and a nonwoven fabric sheet can be obtained which is excellent in the morphological stability and in the property of reducing damage to the fire barrier layer when being exposed to a flame.

In the nonwoven fabric form, the fibers are only entangled with each other, and the fibers constituting the nonwoven fabric fall off by wear and the nonwoven fabric is thinned and easily breaks when the nonwoven fabric is used for a long time under normal use environment. On the other hand, when the scrim layer is constituted by a regular and uniform organization as a woven knitted fabric and when the line of thread is organized in a specific structure and the single fiber of the line of thread has an organization of spinning, entanglement, twisting or the like, the single fiber is further organized in a corresponding structure. Hence, the scrim layer is superior to the fire barrier layer in wear resistance. In other words, in addition to the morphological stabilization and reduction in damage to the fire barrier layer when a flame is hit as described above, the scrim layer functions as a wear resistant layer in the normal use environment in which a flame is not hit, and thus the fibers constituting the scrim layer are required to have mechanical strength in addition to a high LOI value and a melting point range. Hence, in the present invention, at least the carbide-forming heat resistant fiber B to be described later is used in the scrim layer, but other fibers such as the non-melting fiber A and the fiber C to be described later may be mixed in a range in which the effect of the present invention is not impaired, for example, at about 20% by mass.

At least the non-melting fiber A to be described later is used in the fire barrier layer, other fibers such as the carbide-forming heat resistant fiber B and the fiber C to be described later may be mixed in a range in which the effect of the present invention is not impaired. The carbide-forming heat resistant fiber B may be mixed in the fire barrier layer in a range not exceeding 80% by mass since the carbide-forming heat resistant fiber B increases the flame retardancy by being carbonized, and the fiber C may be mixed at about 20% by mass.

<<Non-Melting Fiber A>>

In the present invention, the non-melting fiber A refers to a fiber which does not liquefy but maintains its shape when being exposed to a flame, and those that do not liquefy or ignite at a temperature of 800° C. are preferable and those that do not liquefy or ignite at a temperature of 1000° C. or more are more preferable. Examples of the non-melting fiber having the high-temperature shrinkage rate in the range prescribed in the present invention include a flame resistant fiber, a meta-aramid-based fiber, and a glass fiber. The flame resistant fiber is a fiber obtained by subjecting a fiber selected from an acrylonitrile-based fiber, a pitch-based fiber, a cellulose-based fiber, a phenol-based fiber or the like as a raw material to a flame resistant treatment. These may be used singly or two or more of these may be used at the same time. Among these, flame resistant fibers, of which the high-temperature shrinkage rate is low and the carbonization proceeds by heat, are preferable. Among various flame resistant fibers, an acrylonitrile-based flame resistant fiber is more preferably used as the fiber having a small specific gravity, flexibility, and excellent flame retardancy, and this flame resistant fiber is obtained by heating and oxidizing an acrylic fiber as a precursor in high-temperature air. Examples of commercially available products include Pyromex® (manufactured by Toho Tenax Co., Ltd.) in addition to flame resistant fiber PYRON® (manufactured by Zoltek companies, Inc.) that is used in Examples and Comparative Examples to be described later. Generally, a meta-aramid-based fiber has a high high-temperature shrinkage rate and does not satisfy the high-temperature shrinkage rate prescribed in the present invention, but a meta-aramid-based fiber of which the high-temperature shrinkage rate is adjusted to be in the range of the high-temperature shrinkage rate prescribed in the present invention by a suppression treatment can be preferably used. The non-melting fiber preferably used in the present invention is used in a method in which the non-melting fiber is used singly or is combined with a different material, and the fiber length is preferably in a range of 30 to 120 mm, more preferably in a range of 38 to 70 mm. When the fiber length is in the range of 38 to 70 mm, it is possible to obtain a nonwoven fabric by a general needle punching method or a water-jet interlacing method and it is easy to combine with a different material. The thickness of the single fiber of the non-melting fiber is also not particularly limited, but the single fiber fineness is preferably in a range of 0.1 to 10 dtex from the viewpoint of carding process-passing.

When the content of the non-melting fiber in the nonwoven fabric sheet is too low, the function as an aggregate is insufficient, and thus the mixing ratio of the non-melting fiber A in the nonwoven fabric is preferably 15% by mass or more, more preferably 20% by mass or more. The upper limit is preferably 70% by mass or less.

<<Carbide-Forming Heat Resistant Fiber B>>

The carbide-forming heat resistant fiber B used in the present invention refers to one of which the LOI value is in the range prescribed in the present invention and the mass residue rate is 10% by mass or more when being heated in the air at 300° C. for 5 minutes and may be a non-melting fiber or a thermoplastic fiber.

The non-melting fiber refers to a fiber which does not liquefy but maintains its shape when being exposed to a flame and one that does not liquefy or ignite at a temperature of 800° C., and specific examples of these include a flame resistant fiber, a meta-aramid-based fiber, and a glass fiber. Examples of the flame resistant fiber include an acrylonitrile-based fiber, a pitch-based fiber, a cellulose-based fiber, and a phenol-based fiber.

The thermoplastic fiber is one having a melting point lower than the ignition temperature of the non-melting fiber A.

Preferred specific examples of the carbide-forming heat resistant fiber B include fibers formed of polymers selected from the group consisting of anisotropic molten polyester, flame retardant poly(alkylene terephthalate), flame retardant poly(acrylonitrile butadiene styrene), flame retardant polysulfone, poly(ether-ether-ketone), poly(ether-ketone-ketone), polyether sulfone, polyarylate, polyarylene sulfide, polyphenylsulfone, polyetherimide, polyamide-imide, aramids such as meta-aramid and para-aramid, and any mixture of these. These may be used singly or two or more of these may be used at the same time. As the LOI value is in the range prescribed in the present invention, combustion in the air is suppressed and the polymer is likely to be carbonized.

When a non-meltable fiber is used to form a scrim, a dense carbonized layer having the shape of scrim is formed by heating, the deformation of the entire nonwoven fabric sheet can be suppressed by receiving the stress even when the web portion forming the fire barrier layer undergoes heat shrinkage, and thus the flame shielding performance can be maintained for a long time.

When a scrim is formed using a thermoplastic fiber, as the melting point is lower than the ignition temperature of the non-melting fiber A, the molten polymer forms a dense carbonized layer on the flame contact surface, and thus the heat damage to the fire barrier layer is alleviated, as well as a firm carbonized film is formed even on the surface of the non-melting fiber A and between the fibers and is further carbonized to increase the effect of shielding oxygen, the oxidative deterioration of the non-melting fiber A in the fire barrier layer can be further suppressed, and as a result, the flame shielding performance can be maintained for a long time. In that case, the melting point is lower than the ignition temperature of the non-melting fiber A by preferably 200° C. or more, still more preferably 300° C. or more.

Fibers constituting the scrim layer are required to have mechanical strength in addition to a high LOI value and a melting point range from the viewpoint that the scrim layer functions as a wear resistant layer in addition to the morphological stabilization and reduction in damage to the fire barrier layer when a flame is hit as described above. Among such carbide-forming heat resistant fibers B, preferred non-melting fibers are aramid fibers such as meta-aramid fiber and para-aramid fiber and the most preferred thermoplastic fiber is polyphenylene sulfide fiber (hereinafter, also referred to as PPS fiber) from the viewpoint of easy availability.

Even a polymer of which the LOI value is not in the range prescribed in the present invention can be preferably used by being treated with a flame retardant as long as the LOI value of the polymer itself after the treatment is in the range prescribed in the present invention. By containing a phosphorus atom or a sulfur atom in the polymer structure or in the flame retardant, phosphoric acid or sulfuric acid is generated at the time of the thermal decomposition of the polymer or flame retardant, and a mechanism for dehydration carbonization of the polymer substrate is developed. Accordingly, PPS is most preferable, or in the case of using a flame retardant a phosphorus-based or sulfur-based flame retardant is preferable.

The carbide-forming heat resistant fiber B used in the present invention is used by the above-mentioned method in which the polymer fiber is used singly or is combined with a different material, and may be a short fiber or a long fiber.

In the case of short fibers, the fiber length is preferably in a range of 30 to 120 mm, more preferably in a range of 38 to 51 mm. When the fiber length is in the range of 38 to 51 mm, it is easy to produce spun yarn by a general spinning process and the obtained spun yarn is woven or knitted by a general method to obtain a woven or knitted product, which is formed into a scrim.

In the case of filament, the gray yarn may be used as it is or may be woven or knitted after being subjected to various kinds of generally known yarn processing to form a scrim.

The thickness of the single fiber of the carbide-forming heat resistant fiber B is not particularly limited, but the single fiber fineness is preferably in a range of 0.1 to 10 dtex from the viewpoint of carding process-passing in the case of short fibers.

The PPS fiber preferably used in the present invention is a synthetic fiber formed of a polymer of which the polymer structural unit includes —($C_6H_4$—S)— as the main structural unit. Typical examples of these PPS polymers include polyphenylene sulfide, polyphenylene sulfide sulfone, polyphenylene sulfide ketone, random copolymers and block copolymers of these, and any mixtures of these. As a particularly preferred PPS polymer, a polyphenylene sulfide containing a p-phenylene sulfide unit represented by —($C_6H_4$—S)— as the main structural unit of the polymer preferably at 90% by mole or more is desirable. From the viewpoint of mass, polyphenylene sulfide containing a p-phenylene sulfide unit at 80% by mass, still more preferably at 90% by mass or more is desirable.

The method for producing the PPS fiber used in the present invention is preferably a method in which a polymer having the above-mentioned phenylene sulfide structural unit is melted at a temperature equal to or higher than its melting point and spun from a spinneret to form a fiber. The spun fiber is an undrawn PPS fiber as it is. Most of the undrawn PPS fibers have an amorphous structure and a high fracture elongation. On the other hand, such fibers are inferior in dimensional stability due to heat, and thus drawn fibers in which the strength and thermal dimensional stability of the fibers are improved by hot drawing and orientation after spinning are commercially available. As PPS fibers, a plurality of PPS fibers such as "TORCON®" (manufactured by TORAY INDUSTRIES, INC.) and "PROCON®" (manufactured by TOYOBO CO., LTD.) are in circulation.

In the present invention, the undrawn PPS fiber and the drawn fiber can be used concurrently in the range satisfying the range of the present invention. Instead of the PPS fiber, it is of course possible to concurrently use a drawn fiber and an undrawn fiber of a fiber satisfying the range of the present invention.

The fibers used in the nonwoven fabric web of the fire barrier layer preferably have a fiber length in a range of 30 to 120 mm, more preferably in a range of 38 to 70 mm. When the fiber length is in the range of 38 to 70 mm, it is possible to obtain a nonwoven fabric by a general needle punching method or a water-jet interlacing method and it is easy to combine with a different material. The thickness of the single fiber is also not particularly limited, but the single fiber fineness is preferably in a range of 0.1 to 10 dtex from the viewpoint of carding process-passing.

In a nonwoven fabric sheet formed of a fire barrier layer and a scrim, the thickness of the carbonized layer is thin and the flame shielding performance decreases when the mixing ratio of the carbide-forming heat resistant fiber B is too low. Hence, the mixing ratio of the carbide-forming heat resistant fiber B in the nonwoven fabric sheet is preferably 30% to 85% by mass, still more preferably 40% to 60% by mass.

<<Fiber C Other than Non-Melting Fiber a and Carbide-Forming Heat Resistant Fiber B>>

A fiber C other than the non-melting fiber A and the carbide-forming heat resistant fiber B may be contained in the nonwoven fabric sheet in order to further impart specific performance. For example, a vinylon fiber may be used by being mixed in the fire barrier layer in order to improve the hygroscopic property and water absorbing property of the nonwoven fabric sheet, and a polyester fiber or a nylon fiber may be used by being mixed in the fire barrier layer and the scrim in order to improve the wear resistance of the entire nonwoven fabric sheet. In the nonwoven fabric sheet, the mixing ratio of the fiber C is not particularly limited as long as the effect of the present invention is not impaired, but the mixing ratio of the fiber C other than the non-melting fiber A and the carbide-forming heat resistant fiber B is preferably 20% by mass or less, more preferably 10% by mass or less.

As the morphology of the fibers used in the fire barrier layer portion of the nonwoven fabric sheet of the present invention, the number of crimp of the fibers is preferably 7 crimps/2.54 cm or more, still more preferably 12 crimps/2.54 cm or more in order to sufficiently attain entanglement of the fibers. The number of crimp in the present invention is measured conforming to JIS L 1015 (2000). When the carbide-forming heat resistant fiber B and the other fiber C are contained in the web of the fire barrier layer portion in addition to the non-melting fiber A, the lengths of short fibers of these respective fibers are preferably the same as one another in order to obtain a more uniform web. The same length does not have to be exactly the same, and the lengths of the carbide-forming heat resistant fiber B and the other fiber C may have a difference of about ±5% from the length of the non-melting fiber A. From this viewpoint, the fiber length of the non-melting fiber A and the lengths of the carbide-forming heat resistant fiber B and the other fiber C are all preferably in a range of 30 to 120 mm, more preferably in a range of 38 to 70 mm.

The nonwoven fabric sheet of the present invention is produced by interlacing a web fabricated using the short fibers, namely, the fire barrier layer and a scrim containing the carbide-forming heat resistant fiber B by a needle punching method, a water-jet interlacing method, or the like.

The structure of the nonwoven fabric sheet is not limited as long as it is in the range prescribed in the present invention, but the weight per unit area of the nonwoven fabric sheet is desirably 80 g/m$^2$ or more since the flame shielding performance and the wear resistance are superior as the weight per unit area is greater. The weight per unit area is determined by converting the mass of a 30 cm square sample into the mass per 1 square meter.

After the nonwoven fabric sheet is produced, heat setting may be performed using a stenter or calendering may be performed in the range prescribed in the present invention. As a matter of course, the gray fabric may be used as it is. The setting temperature is preferably a temperature at which the effect of suppressing the high-temperature shrinkage rate is attained, and is preferably 160° C. to 240° C., more preferably 190° C. to 230° C. The calendering is to adjust the thickness and surface feel of the nonwoven fabric, and the speed, pressure, and temperature for calendering are not limited as long as they are in the ranges prescribed in the present invention.

The nonwoven fabric sheet of the present invention thus obtained is excellent in flame shielding performance, heat insulating property, and wear resistance, thus is suitable for use as a wall material, a floor material, a fire blocking material for cushions, and the like that are required to exhibit a fire spread preventing effect and wear resistance, and can be particularly suitably used as a fire-blocking material for urethane cushions and a fire-blocking material for bed mattresses of motor vehicles and aircraft.

EXAMPLES

Next, the present invention will be specifically described based on Examples. However, the present invention is not limited to only these Examples. Various changes and modifications can be made without departing from the technical scope of the present invention. Incidentally, the methods for measuring various properties used in the present Examples are as follows.

[Weight Per Unit Area]

The mass of a 30 cm square sample was measured and expressed in mass per 1 m$^2$ (g/m$^2$).

[Thickness]

The thickness was measured conforming to JIS L 1913 (2010).

[Evaluation on Flame Shielding Performance and Heat Insulating Property]

Soft urethane foam commercially available from Fuji Gomu co., Ltd. is cut into a length of 20 cm, a width of 20 cm, and a thickness of 20 cm to obtain urethane foam 1. The nonwoven fabric sheet 2 of the present invention is covered on the urethane foam 1 so that the scrim surface is on the outside, and the place indicated by 3 in the FIGURE is sewn with a cotton thread to form the sewn portion 3. The sample is heated using a burner 4 for 5 minutes at a distance of 5 cm from the sample. As the burner, Power Torch RZ-730 manufactured by Shinfuji Burner co., ltd. was used. The temperature of the flame is adjusted to 1000 degrees using a thermocouple. After 5 minutes of heating, the flame of the burner was extinguished, and the state of the nonwoven fabric sheet and the internal urethane was observed. A case in which a hole is not formed in the nonwoven fabric sheet after 5 minutes of heating is evaluated "to exhibit flame shielding performance" and graded A. A case in which a hole is formed in the nonwoven fabric during 5 minutes of heating and the flame reaches the internal urethane foam is evaluated "not to exhibit flame shielding performance" and graded F. A case in which the flame of the burner is extinguished after 5 minutes of heating, the sample is cooled at room temperature for 10 minutes, and the mass reduction rate of the internal urethane foam is greater than 10% by mass % is evaluated "not to exhibit heat insulating property" for the urethane foam and graded F. A case in which the mass reduction rate of the urethane foam was 10% by mass or less was graded B, and a case in which the mass reduction rate of the urethane foam was 5% by mass or less was graded A.

[Evaluation on Wear Resistance]

Conforming to JIS L 1096 E method (Martindale method), the standard friction cloth and the scrim surface of the nonwoven fabric sheet were rubbed in multiple directions, and the number of frictions to the end point was measured. For those without a scrim, the felt surface was rubbed. The average for three times was calculated and expressed in unit of ten times.

Next, terms in the following Examples and Comparative Examples will be described.

<<Drawn Fiber of PPS Fiber>>

As a drawn PPS fiber, "TORCON®", product number S371 (manufactured by TORAY INDUSTRIES, INC.) having a single fiber fineness of 2.2 dtex (diameter: 14 μm) and a cut length of 51 mm was used. This PPS fiber has an LOI value of 34 and a melting point of 284° C. The number of crimp of this PPS fiber was 13 crimps/2.54 cm.

<<Flame Resistant Fiber>>

A 1.7 dtex flame resistant fiber PYRON (manufactured by Zoltek companies, Inc.) cut into 51 mm was used. The high-temperature shrinkage rate of PYRON was 1.6%. When PYRON was heated by a method conforming to JIS K 7193 (2010), ignition was not observed even at 800° C., and the ignition temperature thereof was 800° C. or more. The thermal conductivity was 0.042 W/m·K. The number of crimp of this flame resistant fiber was 11 crimps/2.54 cm.

<<Meta-Aramid Fiber>>

A 1.7 dtex meta-aramid fiber (manufactured by Toray Chemical Korea Inc.) cut into 51 mm was used. The number of crimp of this meta-aramid fiber was 11 crimps/2.54 cm.

<<Polyethylene Terephthalate (PET) Fiber>>

As a drawn PET fiber, "TETORON®" (manufactured by TORAY INDUSTRIES, INC.) having a single fiber fineness of 2.2 dtex (diameter: 14 μm) and a cut length of 51 mm was used. This PET fiber has an LOI value of 22 and a melting point of 267° C. The number of crimp of this PET fiber was 15 crimps/2.54 cm.

Example 1

(Spinning)

The drawn fibers of PPS fibers were mixed together using an opener, then were further mixed together using a blower, and then passed through a carding machine to be formed into a sliver. The mass of the sliver obtained was 20.19 g/5.46 m. Subsequently, the total draft was set to eight times and the sliver was drawn using a drawing frame to be formed into a sliver of 18.69 g/5.46 m. Subsequently, the sliver was twisted to 0.55 T/2.54 cm using a roving machine and drawn 7.4 times to obtain a roving yarn of 216.20 g/5.46 m. Subsequently, the roving yarn was twisted to 16.4 T/2.54 cm using a spinning machine, drawn 30 times in total draft and twisted to obtain a No. 30 cotton count spun yarn. The spun yarn obtained was subjected to second twist at 64.7 T/2.54 cm using a double twister to obtain a No. 30 count 2ply yarn.

(Weaving)

The spun yarn obtained was woven in plain weave of warp 138 threads/10 cm and weft 79 threads/10 cm using a rapier loom to obtain a scrim of 94 g/m$^2$.

(Fabrication of Nonwoven Fabric Sheet)

The flame resistant fibers were mixed together using an opener, then were further mixed together using a blower, and then passed through a carding machine to fabricate a web. The web obtained was stacked using a cross-lapper, then superimposed on the scrim, and formed into a felt using a needle punching machine to obtain a nonwoven fabric sheet including a drawn fiber of PPS fiber and a flame resistant fiber. The mass mixing ratio of the PPS drawn fiber to the flame resistant fiber yarn in the nonwoven fabric sheet was 48:52, the weight per unit area of the nonwoven fabric sheet was 194 g/m$^2$, and the thickness thereof was 1.81 mm.

(Evaluation on Flame Shielding Performance and Heat Insulating Property)

The flame did not penetrate the nonwoven fabric for 5 minutes, the internal urethane foam did not catch fire, and the mass reduction rate of the urethane foam was 1.5% by mass, indicating that the nonwoven fabric sheet exhibited sufficient flame shielding performance and heat insulating property.

(Evaluation on Wear Resistance)

The nonwoven fabric sheet was excellent in wear resistance as the wear resistance thereof was 2,100 times.

Example 2

A nonwoven fabric sheet was fabricated by changing the mass mixing ratio of the drawn fiber of PPS fiber to the flame resistant fiber in the web to 80:20 in Example 1. The weight per unit area of the nonwoven fabric sheet was 194 g/m², the thickness thereof was 1.83 mm, and the mass mixing ratio of the drawn fiber of PPS fiber to the flame resistant fiber in the nonwoven fabric sheet was 90:10.

The flame did not penetrate the nonwoven fabric for 5 minutes, the internal urethane foam did not catch fire, and the mass reduction rate of the urethane foam was 9.3% by mass, indicating that the present nonwoven fabric sheet exhibited sufficient flame shielding performance and heat insulating property. The nonwoven fabric sheet was excellent in wear resistance as the wear resistance thereof was 2,230 times.

Example 3

In Example 1, the mixing ratio in the spun yarn was changed from 100% of the drawn fiber of PPS fiber to 50:50 of the drawn fiber of PPS fiber to PET fiber (1.7 dtex, 51 mm cut), a No. 30 count 2ply yarn was obtained, and the spun yarn obtained was woven in plain weave of warp 138 threads/10 cm and weft 79 threads/10 cm using a rapier loom to obtain a scrim of 94 g/m².

The flame resistant fibers were further mixed together using an opener, then were further mixed together using a blower, and then passed through a carding machine to fabricate a web. The web obtained was stacked using a cross-lapper, then superimposed on the scrim, and formed into a felt using a needle punching machine to obtain a nonwoven fabric sheet including a drawn fiber of PPS fiber and a flame resistant fiber. The mass mixing ratio of the drawn fiber of PPS fiber, the flame resistant fiber and the PET fiber in the nonwoven fabric sheet was 24:52:24, the weight per unit area of the nonwoven fabric sheet was 194 g/m², the thickness thereof was 1.79 mm.

The flame did not penetrate the nonwoven fabric for 5 minutes, the internal urethane foam did not catch fire, and the mass reduction rate of the urethane foam was 9.5% by mass, indicating that the present nonwoven fabric sheet exhibited sufficient flame shielding performance and heat insulating property. The nonwoven fabric sheet was excellent in wear resistance as the wear resistance thereof was 2370 times.

Example 4

In Example 1, the mixing ratio in the spun yarn was changed from 100% of the drawn fiber of PPS fiber to 100% of a meta-aramid fiber, a No. 30 count 2ply yarn was obtained, and the spun yarn obtained was woven in plain weave of warp 138 threads/10 cm and weft 79 threads/10 cm using a rapier loom to obtain a scrim of 94 g/m².

The flame resistant fibers were further mixed together using an opener, then were further mixed together using a blower, and then passed through a carding machine to fabricate a web. The web obtained was stacked using a cross-lapper, then superimposed on the scrim, and formed into a felt using a needle punching machine to obtain a nonwoven fabric sheet including a meta-aramid fiber and a flame resistant fiber. The mass mixing ratio of the meta-aramid fiber to the flame resistant fiber in the nonwoven fabric sheet was 48:52, the weight per unit area of the nonwoven fabric sheet was 194 g/m², and the thickness thereof was 1.78 mm.

The flame did not penetrate the nonwoven fabric for 5 minutes, the internal urethane foam did not catch fire, and the mass reduction rate of the urethane foam was 2.1% by mass, indicating that the present nonwoven fabric sheet exhibited sufficient flame shielding performance and heat insulating property. The nonwoven fabric sheet was excellent in wear resistance as the wear resistance thereof was 2610 times.

Comparative Example 1

In Example 1, the mixing ratio in the spun yarn was changed from 100% of the drawn fiber of PPS fiber to 100% of a PET fiber (1.7 dtex, 51 mm cut), a No. 30 count 2ply yarn was obtained, and the spun yarn obtained was woven in plain weave of warp 138 threads/10 cm and weft 79 threads/10 cm using a rapier loom to obtain a scrim of 94 g/m².

The flame resistant fibers were further mixed together using an opener, then were further mixed together using a blower, and then passed through a carding machine to fabricate a web. The web obtained was stacked using a cross-lapper, then superimposed on the scrim, and formed into a felt using a needle punching machine to obtain a nonwoven fabric sheet including a PET fiber and a flame resistant fiber. The mass mixing ratio of the PET fiber to the flame resistant fiber in the nonwoven fabric sheet was 48:52, the weight per unit area of the nonwoven fabric sheet was 194 g/m², and the thickness thereof was 1.73 mm.

The flame did not penetrate the nonwoven fabric for 5 minutes, but fire spread occurred on the scrim surface, and the heat was transmitted to the internal urethane foam, and the mass reduction rate of the urethane foam was 16.4% by mass, indicating that the present nonwoven fabric sheet was inferior in heat insulating property. The nonwoven fabric sheet was excellent in wear resistance as the wear resistance thereof was 2370 times.

Comparative Example 2

A scrim was not used, but the flame resistant fiber and the drawn fiber of PPS fiber were put into an opener at a mass ratio of 52:48 and mixed, then were further mixed together using a blower, and then passed through a carding machine to fabricate a web. The web obtained was stacked using a cross-lapper and formed into a felt using a needle punching machine to obtain a nonwoven fabric sheet including a drawn fiber of PPS fiber and a flame resistant fiber. The weight per unit area of the nonwoven fabric sheet was 194 g/m² and the thickness thereof was 2.04 mm.

The flame did not penetrate the nonwoven fabric for 5 minutes, and the mass reduction rate of the urethane foam was 4.3% by mass, indicating that the present nonwoven fabric sheet was also excellent in heat insulating property. However, the nonwoven fabric sheet was inferior in wear resistance as the wear resistance thereof was 210 times.

Comparative Example 3

A 1.7 dtex flame resistant fiber PYRON (manufactured by Zoltek companies, Inc.), a 1.0 dtex PPS drawn fiber, "TORCON®" (manufactured by TORAY INDUSTRIES, INC.), and a 3.0 dtex PPS undrawn fiber "TORCON®" (manufactured by TORAY INDUSTRIES, INC.) were each cut into 6 mm and these flame resistant fiber, undrawn fiber of PPS fiber, and drawn fiber of PPS fiber were prepared at a mass ratio of 40:30:30 (namely, flame resistant fiber to PPS fiber=40:60). These were dispersed in water to prepare a dispersion. Wet paper was fabricated from this dispersion using a handmade paper machine. The wet paper was heated and dried at 110° C. for 70 seconds using a rotary dryer, and subsequently heated and pressed one time for each side at a linear pressure of 490 N/cm and a roll rotation speed of 5 m/min a total of two times by setting the surface temperature of the iron roll to 200° C. to obtain a nonwoven fabric sheet. The nonwoven fabric sheet obtained had a weight per unit area of 100 g/m² and a thickness of 0.17 mm.

After 2 minutes and 30 seconds, the carbonized portion hit by the flame had holes opened by the wind pressure of the flame, indicating that the present nonwoven fabric sheet did not exhibit sufficient flame shielding performance. Hence, the internal urethane foam caught fire and completely burned. The nonwoven fabric sheet was inferior in wear resistance as the wear resistance thereof was 340 times.

TABLE 1

|  |  | Example 1 | Example 2 | Example 3 | Example 4 | Comparative Example 1 | Comparative Example 2 | Comparative Example 3 |
|---|---|---|---|---|---|---|---|---|
| Fire barrier layer portion web | Weight per unit area (g/m²) | 100 | 100 | 100 | 100 | 100 | 194 | 100 |
|  | Non-melting fiber A Mixing ratio (%) | Flame resistant yarn 100 wt % | Flame resistant yarn 20 wt % | Flame resistant yarn 100 wt % | Flame resistant yarn 100 wt % | Flame resistant yarn 100 wt % | Flame resistant yarn 52 wt % | Flame resistant yarn 40 wt % |
|  | Carbide-forming heat resistant fiber B Mixing ratio (%) |  | PPS fiber 80 wt % |  |  |  | PPS fiber 48 wt % | PPS undrawn fiber 30 wt % PPS drawn fiber 30 wt % |
|  | Other fiber C Mixing ratio (%) |  |  |  |  |  |  |  |
| Scrim layer portion | Weight per unit area (g/m²) | 94 | 94 | 94 | 94 | 94 |  |  |
|  | Non-melting fiber A Mixing ratio (%) |  |  |  |  |  |  |  |
|  | Cabide-forming heat resistant fiber B Mixing ratio (%) | PPS fiber 100 wt % | PPS fiber 100 wt % | PPS fiber 50 wt % | Meta-aramid fiber 100 wt % |  |  |  |
|  | Other fiber C Mixing ratio (%) |  |  | PET fiber 50 wt % |  | PET fiber 100 wt % |  |  |
| Coupling method |  | Needle punching | Needle punching | Needle punching | Needle punching | Needle punching | Needle punching | Wet papermaking |
| Entire nonwoven fabric sheet | Weight per unit area (g/m²) | 194 | 194 | 194 | 194 | 194 | 194 | 100 |
|  | Non-melting fiber A Mixing ratio (%) | Flame resistant yarn 52 wt % | Flame resistant yarn 10 wt % | Flame resistant yarn 52 wt % | Flame resistant yarn 52 wt % | Flame resistant yarn 52 wt % | Flame resistant yarn 52 wt % | Flame resistant yarn 40 wt % |
|  | Carbide-forming heat resistant fiber B Mixing ratio (%) | PPS fiber 48 wt % | PPS fiber 90 wt % | PPS fiber 24 wt % | Meta-aramid fiber 48 wt % |  | PPS fiber 48 wt % | PPS fiber 60 wt % |
|  | Other fiber C Mixing ratio (%) |  |  | PET fiber 24 wt % |  | PET fiber 48 wt % |  |  |
|  | Thickness (mm) | 1.81 | 1.83 | 1.79 | 1.78 | 1.73 | 2.04 | 0.17 |
| Performance | Flame shielding performance | A With flame shielding performance | A With flame shielding performance | A With flame shielding performance | A With flame shielding performance | A With flame shielding performance | A With flame shielding performance | F Without flame shielding performance |
|  | Heat insulating property | A 1.5 wt % | B 9.3 wt % | B 9.5 wt % | A 2.1 wt % | F 16.4 wt % | A 4.3 wt % | F Complete burning |
|  | Wear durability | 2100 | 2230 | 2370 | 2610 | 2370 | 210 | 340 |

INDUSTRIAL APPLICABILITY

The present invention is effective in fire spread prevention, is suitable for use in clothing materials, wall materials, floor materials, ceiling materials, covering materials, and the like that are required to exhibit flame retardancy, and is particularly suitable for use in fireproof protective clothing and fire spread preventive covering materials for urethane sheet materials and fire spread prevention for bed mattresses of motor vehicles and aircraft.

DESCRIPTION OF REFERENCE SIGNS

1: Urethane foam
2: Nonwoven fabric sheet
3: Sewn portion
4: Burner

The invention claimed is:

1. A nonwoven fabric sheet comprising at least one fire barrier layer formed of a web containing a non-melting fiber A having a high-temperature shrinkage rate of 3% or less and a thermal conductivity conforming to ISO 22007-3 (2008) of 0.060 W/m·K or less,
wherein the non-melting fiber A is a flame resistant fiber,
wherein a single fiber of the non-melting fiber A has a thickness in a range of 0.1 to 10 dtex,
wherein the fire barrier layer is coupled with a scrim layer that includes a woven fabric or a knitted fabric containing a carbide-forming heat resistant fiber B having a LOI value conforming to JIS K 7201-2 (2007) of 25 or more,
wherein the carbide-forming heat resistant fiber B which is contained in the scrim layer is a fiber formed of polyarylene sulfide, and
wherein the nonwoven fabric sheet contains the carbide-forming heat resistant fiber B at 30% to 85% by mass.

2. The nonwoven fabric sheet according to claim 1, wherein the nonwoven fabric sheet contains the non-melting fiber A at 15% to 70% by mass.

3. The nonwoven fabric sheet according to claim 1, wherein the nonwoven fabric sheet contains a fiber C other than the non-melting fiber A and the carbide- forming heat resistant fiber B at 20% by mass or less.

* * * * *